United States Patent
Kozine et al.

(10) Patent No.: US 9,105,035 B2
(45) Date of Patent: Aug. 11, 2015

(54) METHOD AND APPARATUS FOR CUSTOMER EXPERIENCE SEGMENTATION BASED ON A WEB SESSION EVENT VARIATION

(75) Inventors: Mikhail B. Kozine, San Francisco, CA (US); Robert I. Wenig, San Francisco, CA (US); Travis Spence Powell, San Francisco, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 225 days.

(21) Appl. No.: 13/532,415

(22) Filed: Jun. 25, 2012

(65) Prior Publication Data

US 2013/0342538 A1 Dec. 26, 2013

(51) Int. Cl.
*G06T 11/20* (2006.01)
*G06Q 30/02* (2012.01)
*H04L 29/08* (2006.01)

(52) U.S. Cl.
CPC ............ *G06Q 30/02* (2013.01); *G06Q 30/0202* (2013.01); *H04L 67/306* (2013.01)

(58) Field of Classification Search
None
See application file for complete search history.

(56) References Cited

U.S. PATENT DOCUMENTS

| 6,898,597 | B1 | 5/2005 | Cook et al. | |
|---|---|---|---|---|
| 7,058,657 | B1* | 6/2006 | Berno ................... | 1/1 |
| 7,620,523 | B2 | 11/2009 | Marvasti et al. | |
| 7,734,607 | B2 | 6/2010 | Grinstein | |
| 8,832,265 | B2 | 9/2014 | Kozine | |
| 2002/0075324 | A1* | 6/2002 | Combs et al. ................ | 345/848 |
| 2002/0188618 | A1* | 12/2002 | Ma et al. ....................... | 707/102 |
| 2003/0122827 | A1* | 7/2003 | Van Koningsveld .......... | 345/440 |
| 2003/0163365 | A1 | 8/2003 | Farnes | |
| 2003/0195395 | A1* | 10/2003 | Gotschim et al. ............. | 600/300 |
| 2004/0103051 | A1 | 5/2004 | Reed | |
| 2005/0165736 | A1* | 7/2005 | Oosta ............................... | 707/2 |
| 2006/0277087 | A1* | 12/2006 | Error .................................. | 705/8 |
| 2007/0250620 | A1* | 10/2007 | Shah et al. ..................... | 709/224 |

(Continued)

FOREIGN PATENT DOCUMENTS

WO 2013/165536 11/2013

OTHER PUBLICATIONS

Hao et al., Visual Sentiment Analysis on Twitter Data Streams, Oct. 2011, IEEE Symposium on Visual Analytics Science and Technology, pp. 277-278.*

(Continued)

*Primary Examiner* — Aaron M Richer
*Assistant Examiner* — Anh-Tuan V Nguyen
(74) *Attorney, Agent, or Firm* — Stolowitz Ford Cowger LLP

(57) ABSTRACT

Web session events are captured during different web sessions. A segmentation model is generated based on a number of occurrences of the web session events for different time stamp periods. The segmentation model plots a segmentation graph that may identify differences between the web session events with respect to time factors. The segmentation model may use the whole dataset of event occurrences as an input without any preliminary data segmentation or discrimination. The model can associate the web session events with the different geographic locations, reveal possible reasons for customer experience difference for the users from different locations and provide statistically sound explanation of this difference. The model is scalable and may work with big data acquired by web-based commerce sites with wide international customer base.

16 Claims, 13 Drawing Sheets

(56) References Cited

U.S. PATENT DOCUMENTS

| | | | |
|---|---|---|---|
| 2008/0005793 | A1 | 1/2008 | Wenig |
| 2008/0288306 | A1* | 11/2008 | MacIntyre et al. ............... 705/7 |
| 2010/0031156 | A1 | 2/2010 | Doyle et al. |
| 2010/0082301 | A1* | 4/2010 | Skibiski et al. ............... 702/188 |
| 2010/0110078 | A1* | 5/2010 | Yanai ............................ 345/440 |
| 2010/0164957 | A1* | 7/2010 | Lindsay et al. ............... 345/440 |
| 2010/0332475 | A1* | 12/2010 | Birdwell et al. ............... 707/737 |
| 2011/0078004 | A1* | 3/2011 | Swanson, Sr. ............. 705/14.13 |
| 2011/0173264 | A1* | 7/2011 | Kelly ........................... 709/205 |
| 2011/0320880 | A1 | 12/2011 | Wenig |
| 2012/0036175 | A1* | 2/2012 | Tang ............................ 708/424 |
| 2012/0036256 | A1* | 2/2012 | Shen et al. .................... 709/224 |
| 2013/0297767 | A1 | 11/2013 | Kozine |
| 2013/0342538 | A1 | 12/2013 | Kozine |

OTHER PUBLICATIONS

Accenture booklet; downloaded from: http://www.accenture.com/SiteCollectionDocuments/PDF/Accenture-Customer-Insight-Overview-Flyer-5-11.pdf; 2011.

R. J. Kuo, K. Chang & S. Y. Chien. (2004) Integration of Self-Organizing Feature Maps and Genetic-Algorithm-Based Clustering Method for Market Segmentation; Journal of Organizational Computing and Electronic Commerce. vol. 14, Issue 1, pp. 43-60.

Greenwell, T. C.; Fink, J. S.; Pastore, D. L. (2002) Perceptions of the service experience: using demographic and psychographic variables to identify customer segments; Sport Marketing Quarterly 2002 vol. 11 No. 4 pp. 233-241.

L.Eriksson, E.Johansson, N.Kettaneh-Wold, J.Trygg, C.Wikstroem, S.Wold "Multi- and Megavariate Data Analysis" 2006, Umetrics PLS-DA.

Avinash Kaushik. Web Analytics 2.0, Wiley Publishing, 2010. Principal component analysis.

Novak, Thomas et al.; Measuring the Customer Experience in Online Environments: A Structural Modeling Approach, Marketing Science, vol. 19, No. 1, Winter 2000, pp. 22-42, 1526-548X electronic ISSN.

Rho, Jae Jeung, et al.; Internet Customer Segmentation Using Web Log Data; Journal of Business and Economics Research; vol. 2, No. 11; pp. 59-74; Nov. 2004.

User's Guide to SIMCA-P, SIMCA-P+; Umetrics AB; downloaded from http://www.umetrics.com/Content/Document%20Library/Files/UserGuides-Tutorials/SIMCA-P_11_UG.pdf; May 2005.

Bertsimas, et al., A Learning Approach for Interactive Marketing to a Customer Segment; Operations Research vol. 55, No. 6, pp. 1120-1135; Nov.-Dec. 2007.

International Search Report for PCT/US2013/027917; Date of Mailing Jun. 13, 2013.

Written Opinion of the International Searching Authority for PCT/US2013/027917; Date of Mailing Jun. 13, 2013.

Militino A F et al., "Outliers detection in multivariate spatial linear models," Journal of Statistical Planning and Inference, Elsevier, Amsterdam, NL, vol. 136, No. 1, Jan. 1, 2006, pp. 125-146.

Stolowitz Ford Cowger LLP; Listing of Related Cases; Dec. 19, 2013.

* cited by examiner

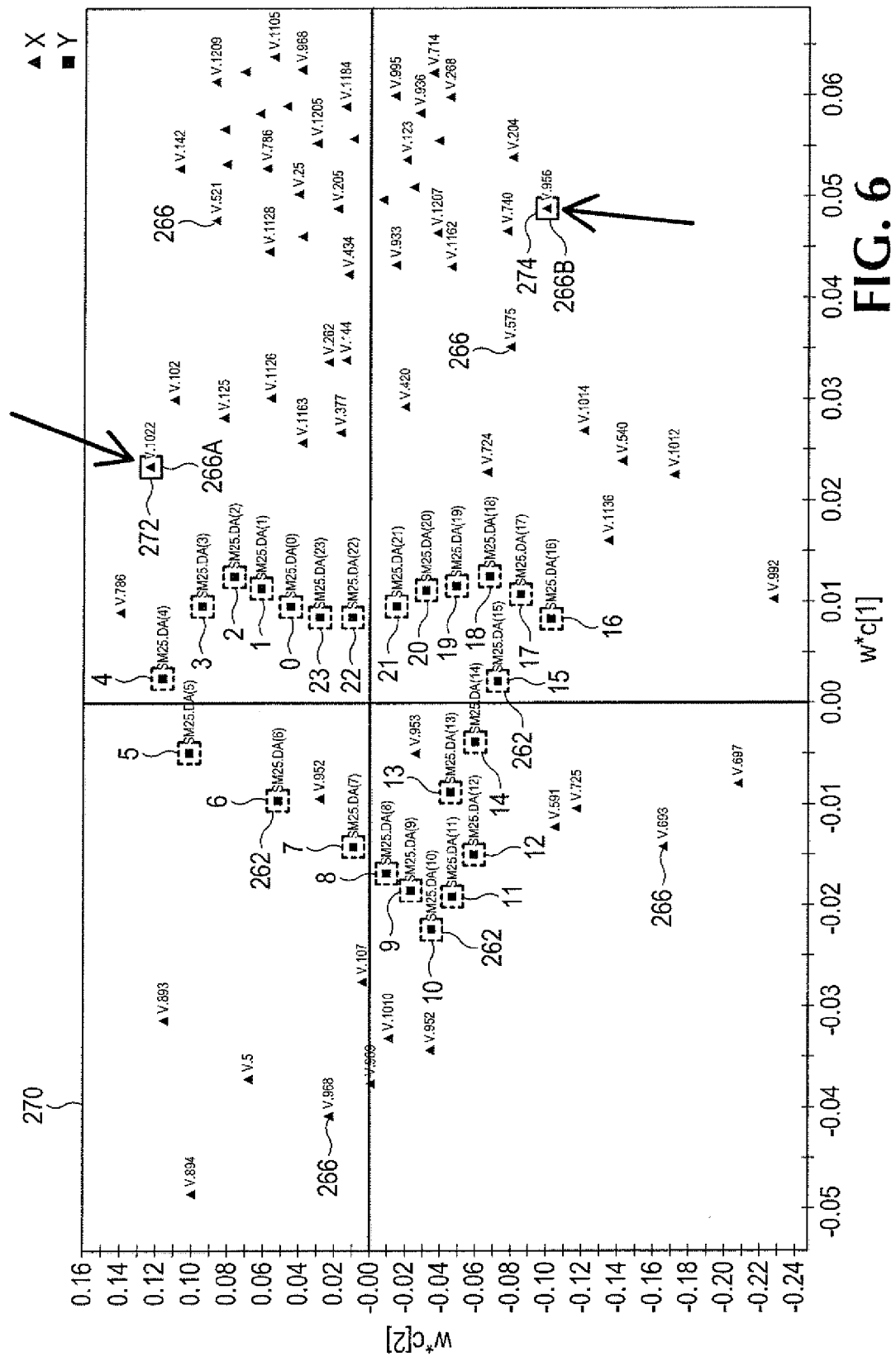

| DTS | UNIQUEID | V(TOTAL_COUNT) |
|---|---|---|
| 10/29/2011 19:00 | 1134 | 124 |
| 10/29/2011 19:00 | 716 | 2419 |
| 10/29/2011 19:00 | 925 | 11259 |
| 10/29/2011 19:00 | 748 | 1996 |
| 10/29/2011 19:00 | 530 | 3 |
| 10/29/2011 19:00 | 83 | 62 |
| 10/29/2011 19:00 | 893 | 835 |
| 10/29/2011 19:00 | 832 | 16642 |
| 10/29/2011 19:00 | 25 | 2083 |

FIG. 12A

| DTS | V.1 | V.5 | V.6 | V.7 | V.8 | V.9 | V.12 | V.13 | V.15 | V.22 | V.25 | V.27 |
|---|---|---|---|---|---|---|---|---|---|---|---|---|
| 10/29/2011 19:00 | 340697 | 1444 | 4 | 34 | 47 | 1196 | 341 | 2814 | 381 | 2 | 2083 | 455 |
| 10/29/2011 20:00 | 328366 | 1410 | 3 | 33 | 59 | 1259 | 358 | 2132 | 830 | 5 | 1944 | 405 |
| 10/29/2011 21:00 | 308820 | 1758 | 3 | 29 | 67 | 1167 | 304 | 2027 | 949 | 4 | 1970 | 413 |
| 10/29/2011 22:00 | 289300 | 1892 | 13 | 36 | 45 | 1128 | 241 | 2187 | 650 | 2 | 1796 | 416 |
| 10/29/2011 23:00 | 273314 | 2223 | 27 | 29 | 61 | 1145 | 249 | 1663 | 834 | NA | 1871 | 364 |
| 10/30/2011 0:00 | 277625 | 2019 | 106 | 24 | 48 | 1134 | 263 | 1774 | 666 | 1 | 1806 | 362 |
| 10/30/2011 1:00 | 292689 | 1806 | 76 | 36 | 60 | 1107 | 306 | 2090 | 636 | 1 | 1757 | 347 |
| 10/30/2011 2:00 | 284262 | 1999 | 17 | 37 | 53 | 1086 | 262 | 2258 | 570 | 2 | 1572 | 305 |
| 10/30/2011 3:00 | 266317 | 2491 | 7 | 34 | 56 | 979 | 213 | 1784 | 555 | NA | 1541 | 338 |
| 10/30/2011 4:00 | 243611 | 2453 | 18 | 23 | 35 | 794 | 190 | 1845 | 551 | 2 | 1379 | 259 |
| 10/30/2011 5:00 | 213285 | 3094 | 35 | 21 | 31 | 689 | 134 | 1508 | 408 | NA | 996 | 198 |

FIG. 12B

METHOD AND APPARATUS FOR CUSTOMER EXPERIENCE SEGMENTATION BASED ON A WEB SESSION EVENT VARIATION

BACKGROUND

Data-driven e-business environments have to deal with overwhelmingly large amounts of data. These large amounts of data can make it difficult to answer the "Why?" questions when analyzing the customer experience. Why overall business today is different from business yesterday, why it is different from business the same day last week, why a particular segment is doing better or worse compared to the same segment same week a month ago? Knowing the answer to these questions is crucial to online business management. One of the widely accepted approaches to finding the answers to the "why" questions is based on segmentation of customer experience.

Customer segmentation refers to identifying events associated with different groups of users. These groups can be composed or revealed based for example, on customer location, demography, patterns of the customer experience, etc. The more sophisticated segmentation methods combine several criteria together to produce a set of business-relevant segments. Performing customer segmentation by statistical methods is notoriously difficult. Customer segmentation is usually performed empirically based on previous similar experience (customers that bought product A usually also buy product B) or heuristic speculations (Asian customers usually prefer product C). Some customer segmentation methods use cluster analysis and decision trees. One hurdle to successful application of these methods is determining how to properly classify the different user groups.

BRIEF DESCRIPTION OF THE DRAWINGS

FIG. 6 depicts an example of a segmentation graph showing two non-correlated web session events from different segments.

FIGS. 12A and 12B depict an example of a process for reshaping captured web session events.

DETAILED DESCRIPTION

Multivariate processing of customer experience data allows geographical segmenting associated with the business events that these users have experienced. This information provides valuable insights about how the service can be improved for the customers from different regions.

One example approach is based on hourly counts of web session events. Intra-day hourly variation of these counts is used to provide geographical segmentation of customer web session experiences. For example, a segmentation model may associate groups of web session events with different geographical locations. The geographic association of certain business events may provide valuable insights into differences in customer experiences or customer behaviors in different parts of the world.

Web Session Events

Figure 1:
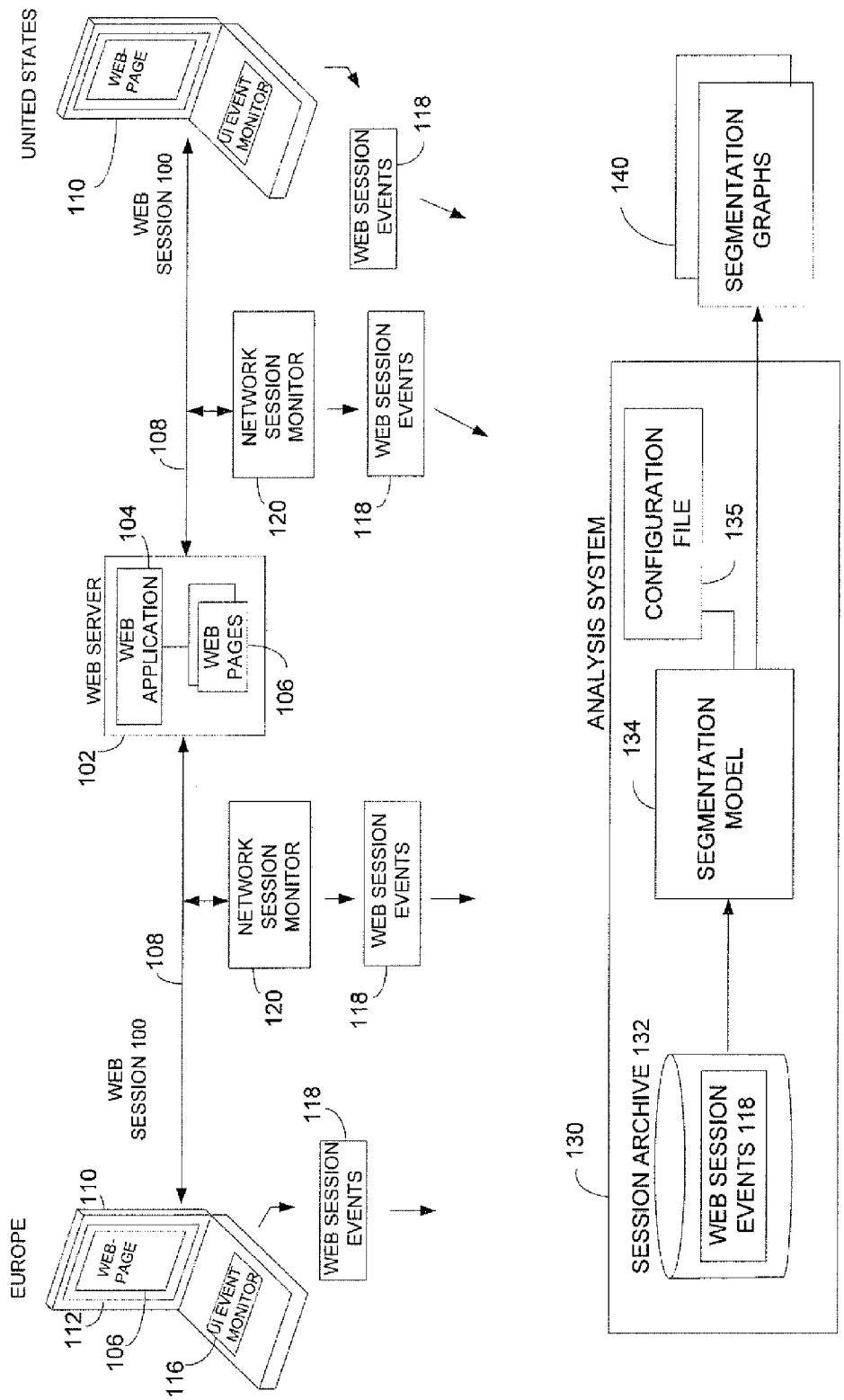
FIG. 1 depicts an example of a system for segmenting web session events.

FIG. 1 shows web sessions 100 conducted between a web application 104 operating on a web server 102 and different computing devices 110. Web application 104 may be developed for any type of online session such as online purchases, online financial services, social networking, etc. Of course, these are just examples, and any type of electronic web based transaction or online activity that may be performed using web application 104.

Computing devices 110 may comprise a Personal Computer (PC), laptop computer, wireless Personal Digital Assistant (PDA), cellular telephone, or any wired or wireless device that accesses and exchanges information with web application 104. Multiple computing devices 110 may conduct different web sessions 100 with web application 104 from different geographical locations at different time periods. For example, a first one of computing devices 100 may be located in Europe and conduct a first web session 100 with web application 104 during a first time of day. A second one of computing devices 100 may be located in the United States and may conduct a second web session 100 with web application 104 at a second different time of day. Any number of computing devices 100 may conduct different web sessions 100 with web application 104 at any geographical location at any time of day.

Computing devices 110 may communicate with web application 104 over network connections 108. Network connections 108 may comprise any combination of connections over an Internet network, a wireless network, a telephone network, Public Services Telephone Network (PSTN), a cellular network, a Wi-Fi network, a cable network, a Wide Area Network (WAN), a Local Area Network (LAN), or the like, or any combination thereof.

In one example, computing devices 110 may send Hyper Text Transfer Protocol (HTTP) requests to web application 104 over network connections 108. Web application 104 may send back one or more of webpages 106 in response to the HTTP requests and computing devices 110 may display the webpages 106 via web browsers 112. Users may generate user interface (UI) events during the web session 100. For example, the users may select links on displayed webpages 106 or enter keystrokes that insert data into fields within the displayed webpages 106. Web application 104 may send additional webpages 106 and/or responses to computing devices 110 in response to the user interface events.

Different web session monitors 116 and/or 120 may capture web session events 118 during web sessions 100. Web session events 118 may comprise the user interface events generated on computing devices 110 and any network data transferred over network connections 108 between computing devices 100 and web application 104. For example, the web session events 118 may comprise the HTTP requests and other data requests sent from computing devices 110 to web application 104 and the webpages and other responses sent back to computing devices 110 from web application 104.

Some of the web session events 118 may never be transferred over network connections 108. For example, some of the user interface events, such as mouse clicks, keystrokes, alpha-numeric data entered into webpage fields, selection of webpage icons, or the like, or any combination thereof, may change a current state of a webpage 106 without sending any data over network connections 108. In another example, a batch data transfer of only completed information from a webpage 106 may be transferred to web application 104 over network connections 108.

Some of the web session events 118 may comprise data sent from web application 104 in response user interface events. For example, web session events 118 may include airline scheduling data used for populating a drop down menu in a previously downloaded webpage 106. The airline scheduling data may have been sent by web application 104 in response to a user entering a city destination into an airline destination field of displayed webpage 106.

Other web session events 118 may comprise webpage logic/code sent by web application 104 along with the webpages 106 to computing devices 110 that further determine the different states or operations in the webpage. The webpage logic may autonomously change the state of webpages 106 or the state of web session 100 on computing devices 110 without ever sending a request or information back over network connections 108 to web application 104.

In another example, some web session events 118 may comprise document object model (DOM) events within webpages 106. For example, changes in the DOM of displayed webpage 106 may be captured by UI event monitors 116 as some of web session events 118. In yet another example, web session events 118 may comprise operating parameters or any other logged data in computing devices 110 and/or server 102. For example, web session events 118 may comprise network bandwidth indicators, processor bandwidth indicators, network condition indicators, computer operating conditions, or the like, or any combination thereof.

In one example, network session monitor 120 may capture the network data, such as the webpages 106, requests, responses, and/or logic exchanged between computing devices 110 and web application 104 over network connections 108. User interface (UI) monitors 116 may capture the user interface events generated locally at computing devices 110. In another example, UI monitors 116 also may capture some or all of the network data exchanged between computing devices 110 and web application 104 over network connections 108.

In yet another example, UI event monitors 116 and/or network session monitor 120 may not capture some or all the actual web session events 118 and they may only detect occurrences of some web session events 118. In this example, monitors 116 and 120 may send unique identifiers identifying occurrences of web session events 118 and may send timestamps indicating when the web session events were detected.

Examples of systems for capturing and/or identifying web session events are described in U.S. Pat. No. 6,286,030 issued Sep. 4, 2001, entitled: Systems and Methods for Recording and Visually Recreating Sessions in a Client-Server Environment now reissued as U.S. Pat. No. RE41903; U.S. Pat. No. 8,127,000 issued Feb. 28, 2012, entitled: Method and Apparatus for Monitoring and Synchronizing User Interface Events with Network Data; and U.S. patent application Ser. No. 13/419,179 filed Mar. 13, 2012, entitled: Method and Apparatus for Intelligent Capture of Document Object Model Events which are all herein incorporated by reference in their entirety.

An analysis system 130 comprises a session archive 132 that retains the captured web session events 118. Web session events 118 are extracted from session archive 132 and used for developing a segmentation model 134. Segmentation model 134 performs multivariate modeling of the web session events 118 and provides insights into differences in customer experiences or customer behaviors. A configuration file 135 may be used by segmentation model 134 to determine what web session events 118 to extract from session archive 132 and for what time periods.

Segmentation model 134 may generate segmentation graphs 140 that plot data points associated with the different web session events 118. Segmentation model 134 also may plot factors on graphs 140 that are used to associate the data points with different parameters. For example, the factors may comprise time zone values associated with different geographical locations. Segmentation model 134 may therefore geographically segment the web session events by plotting the data points for the web session events in sectors of graphs 140 associated with the different geographical locations. This geographical segmentation of business events may be used to identify and explain differences in customer web session experiences or customer web session behaviors.

Web Session Event Segmentation

Figure 2:
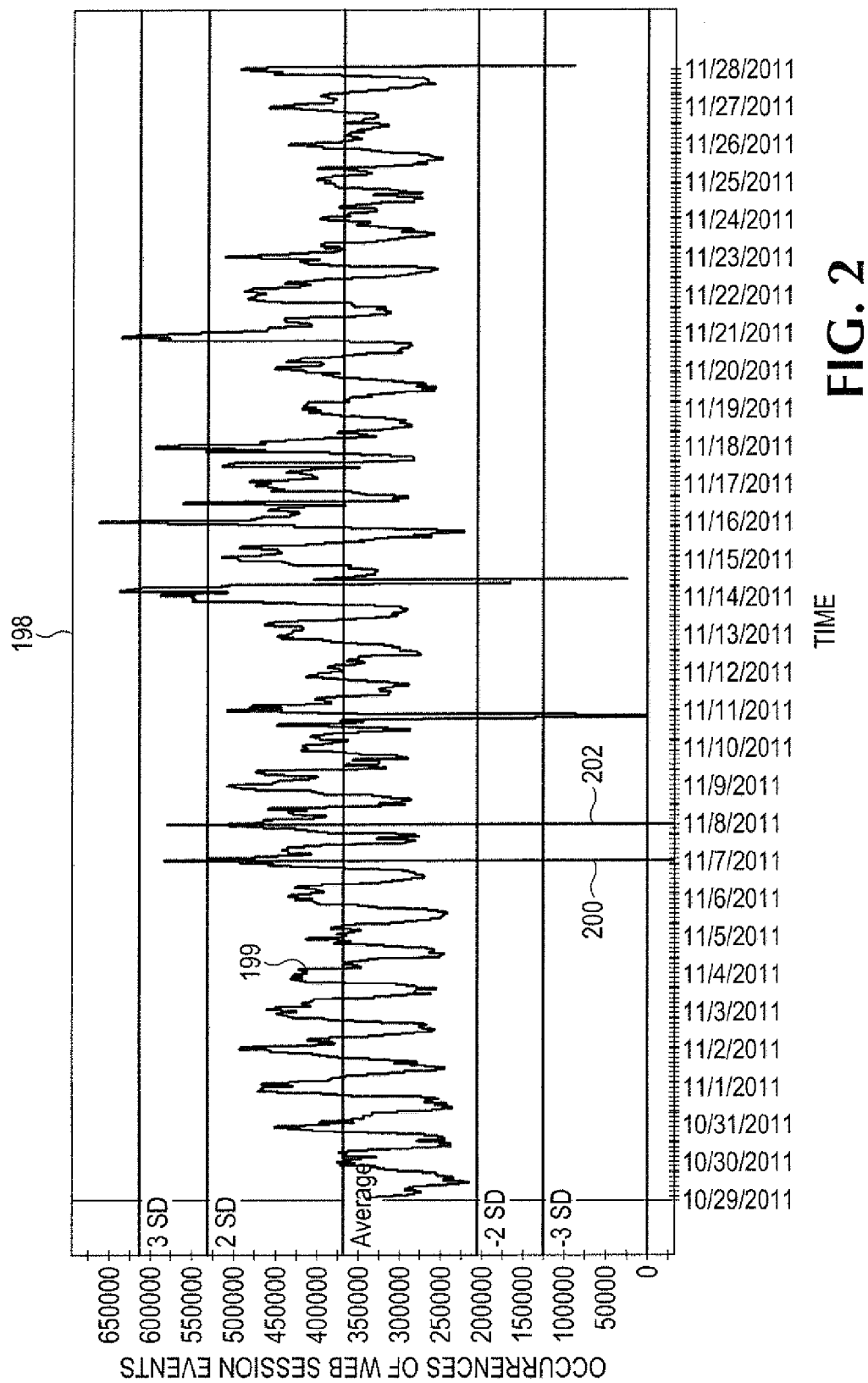
FIG. 2 depicts an example of a graph showing occurrences of typical web session events.

FIG. 2 depicts an example of a graph 198 showing user activity on a website on the basis of a certain event U configured for being captured on the website. Here U represents a certain unique identifier used as a key to the event details table that may contain such information as the event description, configuration, business impact, creation timestamp and so on. The horizontal X-axis represents regular hourly timestamps and the vertical Y-axis represents a number of occurrences of the event U. Curve 199 represents the number of occurrences of web session event U on the website for one month long period. For example, lines 200 and 204 demonstrate the two consecutive maxima of the curve 199. The distance between the line 200 and the line 202 spans approximately 24 hour time period. This demonstrates intrinsic feature of a typical web session event counts during normal business operation of a large online business website—namely, its periodicity. Peaks of online customer activity usually happen in the evening time of the given time zone, and this pattern usually repeats on a daily basis. The larger the e-business customer base, the more pronounced the periodicity of the customer activity on the website.

Graph 198 shows that user activity on the website has a sinusoidal shape with a period of 24 hours. For example, the number of occurrences of web session events appears to peak every 24 hours. The cyclic pattern of graph 198 is more pronounced as more user web sessions are detected.

Figure 3:
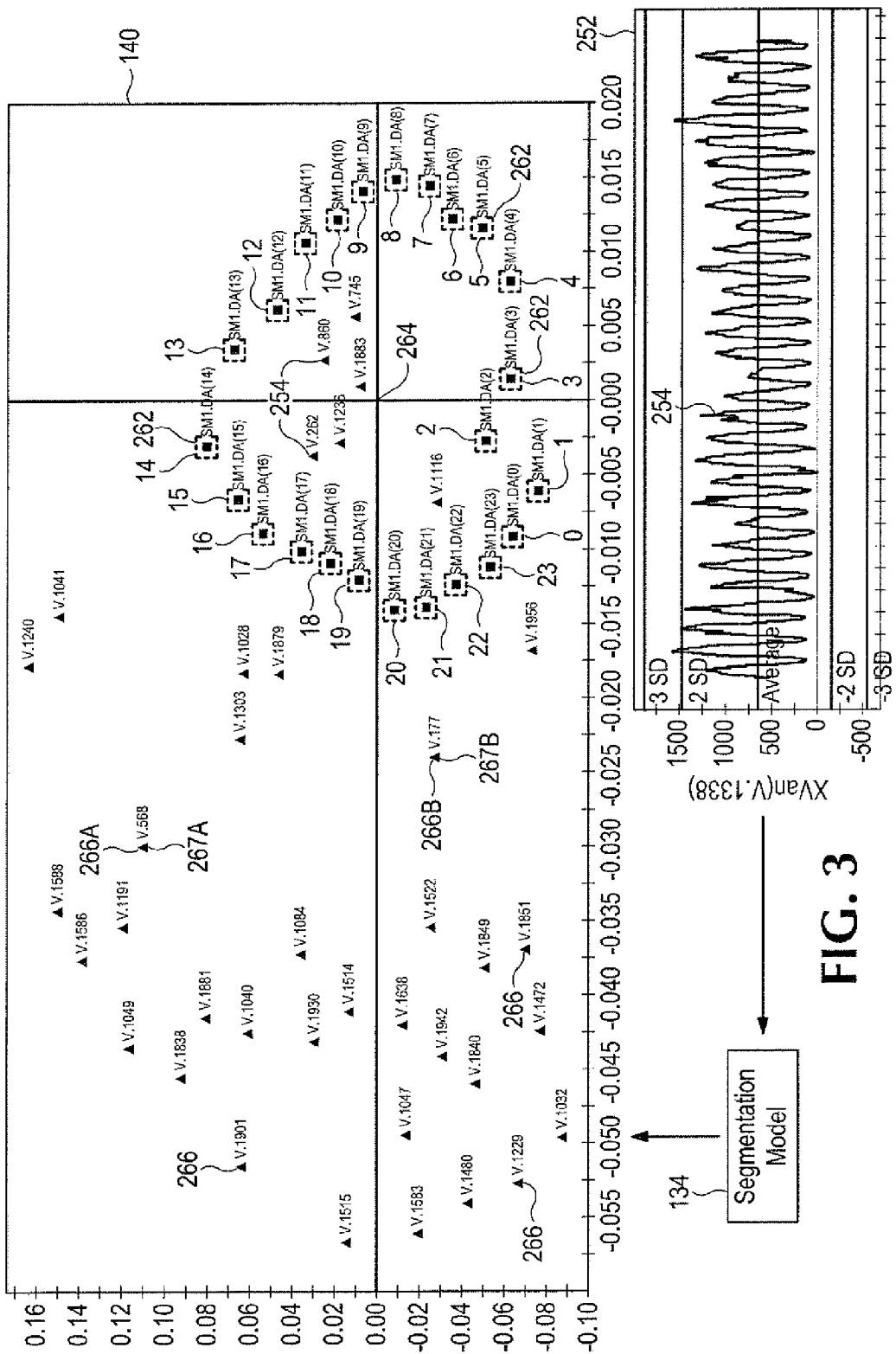
FIG. 3 depicts an example of a segmentation model plotting intra-day hourly variation of web session events.

FIG. 3 depicts an example segmentation graph 140 represented as a scatter plot generated by segmentation model 134. In one example, segmentation model 134 comprises a partial least squares discriminant analysis (PLS-DA) model. Graph 252 shows the number of occurrences for one particular web session event 254 over one month for individual one hour time periods. The horizontal X-axis of graph 252 again represents time and the vertical Y-axis represents the number of occurrences of web session event 254 for each of the one-hour time periods. The Y-axis title of graph 252 indicates that the web session event has unique identifier number 1338. Unique event IDs may be used to normalize the web session events and to provide a key to the needed database tables containing the user experience information.

Segmentation model 134 may provide a projection of multidimensional web session event counts data onto the plane generated by the first two principal components of the PLS- DA model. It also renders a projection of factor weights onto the same plane (represented in dashed boxes). The factors may comprise the hourly timestamps during the 24 hour periodicity interval. A horizontal X-axis of segmentation graph 140 may be associated with the first principal component of the PLS-DA model and the Y-axis may be associated with the second principal component of the model.

Segmentation model 134 plots web session event counts data points 266 on graph 140. Each triangle shaped point in graph 140 represents the data for a certain web session event similar to one depicted on graph 252. The event unique IDs are displayed next to the correspondent data point. For example, event data point 267A may be associated with a first web session event 266A for a website. Event data point 267B may be associated with a second web session event 266B associated with the same website.

Data for each web session event is initially represented as a point in multivariate space with number of dimensions equal to the total number of web session events in the system. The data is transformed into the multivariate space defined by the principal components space by the PLS-DA model described below. This transformation also defines the weights for the time factors representation in the same space.

Scatter bi-plot 140 is a projection onto the plane defined by the first two principal components of both the data points (rendered as triangles) and time factors (rendered as squares) simultaneously. This bi-plot may be used to understand the correlation between web events and time factors. The association of web session event data points 266 with time factors 262 is revealed and may explain the difference between different web session event occurrences at various hours of the day.

Squares 0-23 in graph 140 may represent time factors 262 for each one hour time period in a 24 hour day. For example, time factor 0 may be associated with 12:00 am, time factor 1 may be associated with 1:00 am, time factor 13 may be associated with 1:00 pm, time factor 20 may be associated with 8:00 pm, etc.

As shown in graph 252, the graph of web session event 254 has a periodic shape. Segmentation model 134 reflects the periodicity of web session event counts 254 by the weights of time factors 262 that generally form a circle-shaped formation around an equilibrium point associated with origin 264. Time factors 262 progress in a sequential clockwise or counter-clockwise order around origin 264. For example, time factor 0 is located at a first location with respect to origin 264. Time factor 1 is located at a next adjacent counter-clockwise position with respect to time factor 0 and origin 264. Time factor 2 is located at a next adjacent counter-clockwise position with respect to time factor 1 and origin 264. Other time factors 3-23 follow a similar sequential counter-clockwise order around origin 264. Direction of time factors may be clock-wise or counter-clockwise because the principle components that define the projection plane 140 are provided by the PLS-DA model and the model may not provide direction along principal components. Thus symmetrically equivalent scatter bi-plots can be produced by the PLS-DA model as well. It does not hinder scatter plots analysis and segmentation because only relative location of data points against time factor points may be taken into account.

Mathematical derivation of scattering bi-plots allows useful interpretation and is described in L. Eriksson, E. Johansson, N. Kettaneh-Wold, J. Trygg, C. Wikstroem, S. Wold "Multi- and Megavariate Data Analysis" 2006, Umetrics PLS-DA Jackson. J. E. (1991) which is herein incorporated by reference. The position of event data points 266 on the graph 140 is influenced by the time factors 262 lying in the same direction. For example, time factor 16 may be associated with 4:00 pm and a pacific standard time (PST) time zone. Web session event 266A and time factor 16 may be located along the same direction on graph 140. This would mean that daily maximums on the individual web event graph 252 for the event 266A are located around 4 pm PST.

Time factor 21 may be associated with 9:00 pm hour. Web session event 266B and time factor 21 may be located along the same direction on graph 140. Accordingly, peaks of customer activity (measured as number of occurrences during an hour) on the plot 252 for web session event 266B are located around 9 pm PST every day. The farther the event data point 266 from the origin, the larger is the amplitude of oscillation on the correspondent graph 252.

As seen from the scatter plot 140, the bulk of web events for this particular business are located in the segment between 4 pm and 10 pm PST. This may be an indication that the customer base for this business is located in North America. In the particular case of the scatter plot graph 140, customer behavior may not be further segmented, and so the business impact of such segmentation may be low. However this scatter plot is used here to demonstrate the details of the segmentation scheme.

Factors 262 provided by segmentation model 134 do not need to be based on time or geography. For example, segmentation factors may be associated with different user interface events, Document Object Model (DOM) events, network data events, or the like, or any combination thereof.

Figure 5:
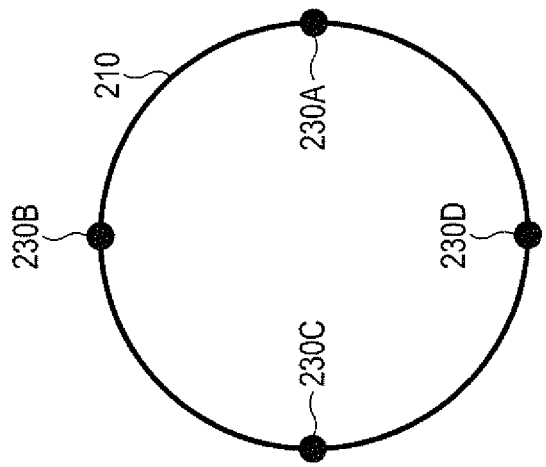
FIG. 5 also depicts an example of periodic events.
Figure 4:
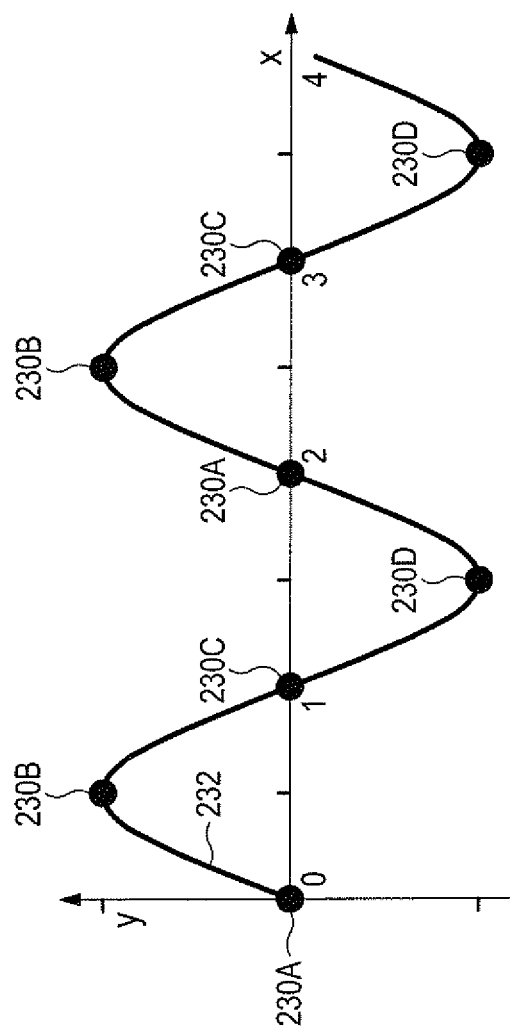
FIG. 4 depicts an example of periodic events.

FIGS. 4 and 5 demonstrate a possible reason why the time factors form a circle around the origin on the scatter plot 140 in FIG. 3. Each of the points 230A-230D in FIG. 4 are located on a sinusoid curve 232 similar to how time factors are located on the event activity graph 252 in FIG. 3. FIG. 5 depicts the same system of points on a phase plane. Each set of points 230A, 230B, 230C, and 230D in FIG. 4 are represented as a single point 230A, 230B, 230C, and 230D, respectively, on a circle 210 in FIG. 5, in the same way as time factors are located around the origin in FIG. 3. The transformation from FIG. 4 to FIG. 5 involves trigonometric functions and of course is different from how a PLS-DA model operates. However, the idea may be similar. The first two principal components of the PLS-DA model capture an informative feature of the event activity graphs, namely their periodicity.

FIG. 6 depicts another example of a scatter bi-plot 270 generated by segmentation model 134 for an intra-day hourly variation of web session events associated with a particular e-commerce website. Again the X-axis represents the first principal model component of the PLS-DA model and the Y-axis represents the second principal component. Time factors 262 represented as squares in FIG. 6 are each associated with a different one hour time period during a 24 hour day. Data points 266 represented as triangles in FIG. 6 are associated with the web session event counts data collected during the analyzed period.

A data point 266A may be associated with a first web session event 272 and a second data point 266B may be associated with a second web session event 274. Web session event 272 is relatively close to the direction specified by time factor 4 associated with a time of 4:00 am and web session event 274 is relatively close to direction of time factor 19 associated with a time of 7:00 pm. According to our interpretation, the event 272 activity peaks at 4 am, whereas the event 274 activity should peak at around 7 pm.

Figure 7:
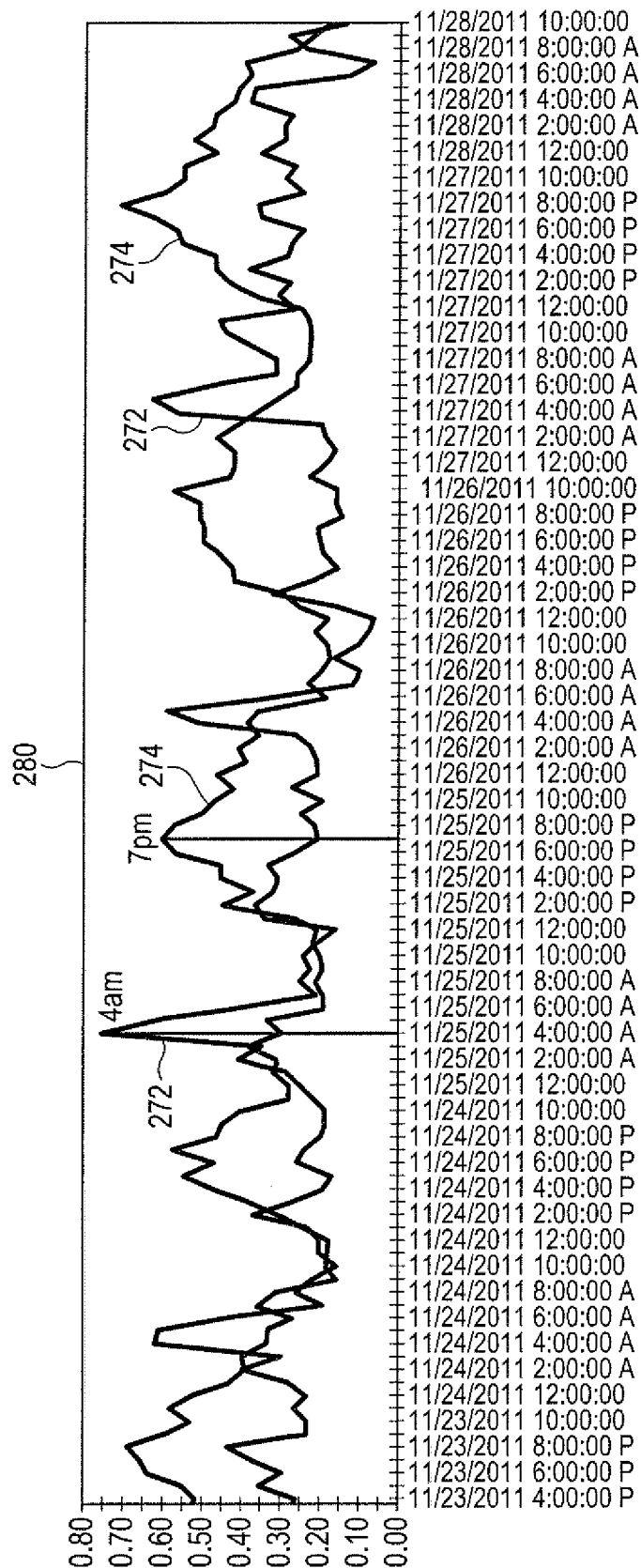
FIG. 7 depicts an example of a graph showing occurrences of the non-correlated web session events from different segments.

FIG. 7 depicts an example of a graph 280 having a horizontal X-axis representing hour time stamp periods for several days and a vertical Y-axis represents a normalized number of occurrences for web session events 272 and 274 previously referred to in FIG. 6. This graph is similar to the graph 252 from FIG. 3 zoomed in to a 5-day period to be able to better monitor the oscillations. Occurrences of web session events 272 and 274 have almost sinusoidal shapes with a 24 hour period. As expected, web session event 272 appears to have a largest number of occurrences at around 4 am each day and appears to have a lowest number of occurrences at around 10:00-11:00 am each day.

This corresponds with the close spatial relationship between the web event data point 266A in FIG. 6 and time factor 4 in FIG. 6. Similarly, the maximum number of occurrences for web session event 274 in graph 280 happens at around 7 pm each day. This corresponds with the relatively close spatial relationship between the web event data point 266B in FIG. 6 and time factor 19 in FIG. 6.

The two data points 266A and 266B associated with web session events 272 and 274, respectively, are spaced relatively far apart in different sectors of graph 270 in FIG. 6. This corresponds with graph 280 in FIG. 7 where the two associated web session events 272 and 274 do not appear to be correlated and have a highest number of occurrences at substantially different times of the day.

Although the bulk of web events data points on this example are concentrated in the sector defined by the time factors from 7 pm to 11 pm, there are also other event data points located in different sectors. This allows for more detailed segmentation of customer activity for a business, such as a US-based interne business that also has a broad international customer base.

Figure 8:
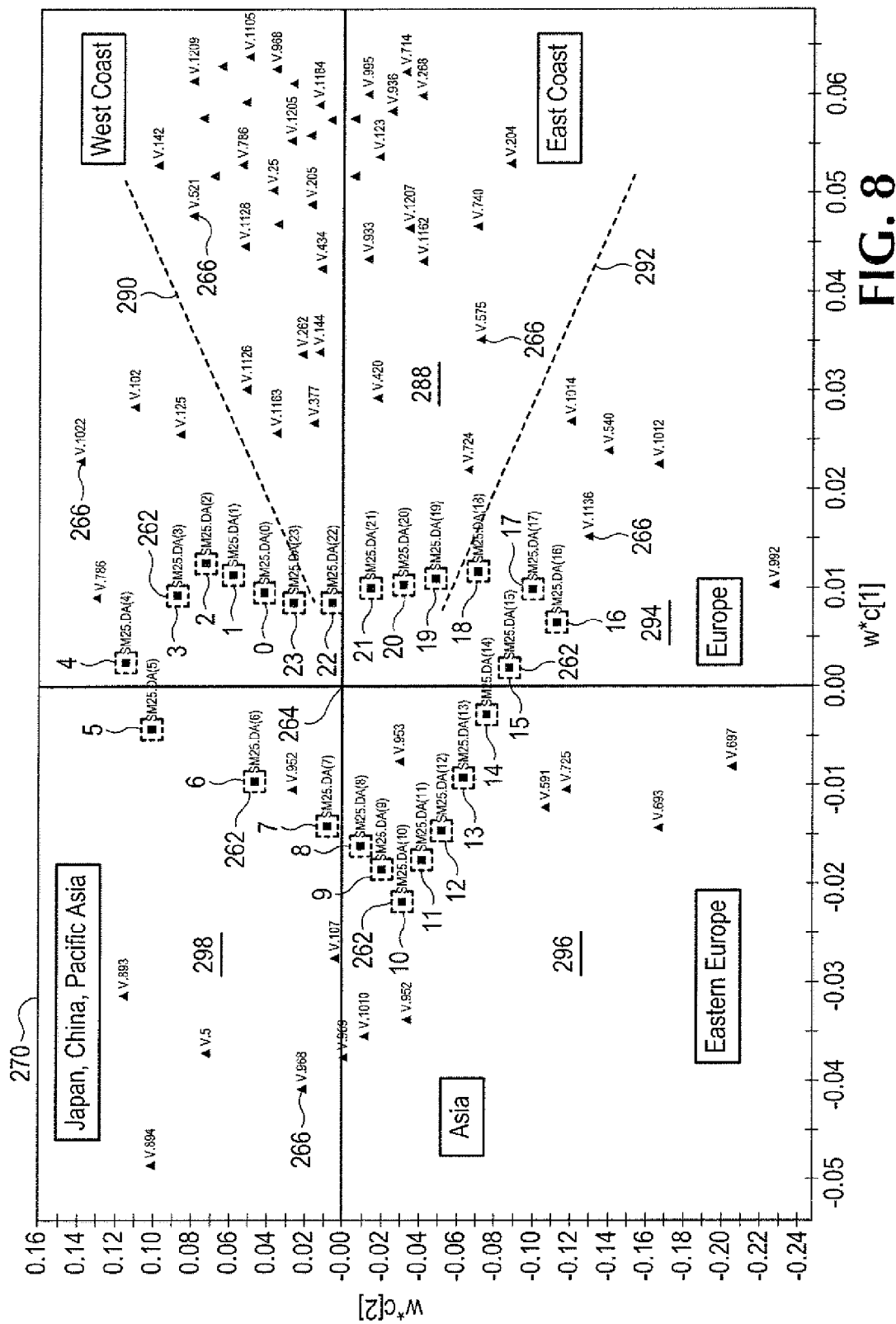
FIG. 8 depicts an example of a segmentation graph with sectors associated with different geographic locations.

FIG. 8 depicts in further detail how different sectors of segmentation graph 270 can be associated with different geographical regions. The analysis is based on the observation that for each web event the maximum activity occurs in the evening times of the correspondent geographical location. In this example, time factors 262 are referenced from an Eastern Time zone in North America. For example, time factor 19 may correspond to 7:00 pm Eastern Time (10:00 Pacific Time) and time factor 23 may correspond to 11:00 pm Eastern Time (8:00 pm Pacific Time).

Correlation between web session events may be determined by directions through origin 264. For example, a sector 288 containing most of the web session data points may be defined between dashed lines 290 and 292. Sector 288 may be associated with web session events for users located in North America. Sector 288 may contain time factors 19-23 associated with a time period from 7:00 pm to 11:00 pm. This may be the time period when users in North America most frequently conduct web sessions with a particular website.

For example, users may most frequently access a particular website after work at around 7:00 pm. Line 290 is aligned adjacent to time factors 22 and 23 associated with times between 10:00-11:00 pm Eastern Time (7:00-8:00 pm Pacific Time). Line 292 is aligned adjacent to time factors 18 and 19 associated with times between 6:00-7:00 pm Eastern Time (3:00-4:00 pm Pacific Time). Accordingly, web session events 266 adjacent to line 290 may be correlated and associated with web sessions for users located on the west coast of North America and web session events 266 adjacent to line 292 may be correlated and associated with web sessions for users located on the east coast of North America.

Other web session events 266 in other sectors of segmentation graph 270 may be associated with other geographic locations. For example, web session events 266 in sector 294 may be associated with web sessions for users located in Western Europe and web session events 266 in sector 296 may be associated with web sessions for users located in Eastern Europe. Web session events 266 in sector 298 may be associated with web sessions for users located in Asia and more specifically to users in Japan, China, and Pacific Asia. These types of scatter plots may provide significant business insights about the customer activity, as shown in the following example.

Figure 9:
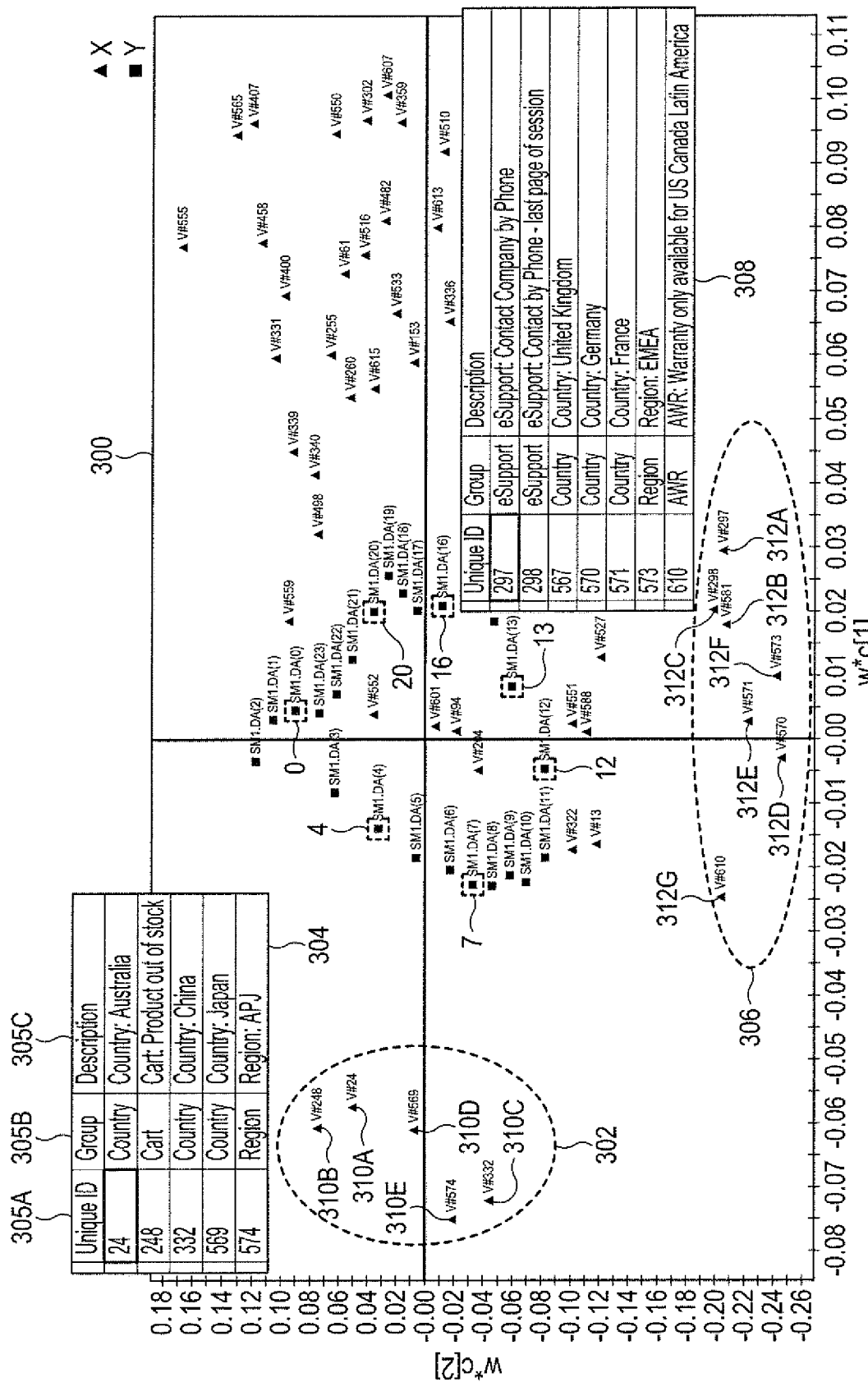
FIG. 9 depicts an example of a segmentation graph showing groups of web session events associated with different geographic locations.

FIG. 9 depicts an example of another segmentation graph 300 generated by the segmentation model for web session events associated with another US-located website. In this example, again the bulk of event data points are concentrated in the sector between 4 pm and 10 pm, indicating the North American segment of customer activity. Analyzing the other data points in this example, the first group of web session events 310A-310E is located in a same sector 302 of segmentation graph 300. The second group of web session events 312A-312-G is located in a different sector 306 of segmentation graph 300. Judging from the correspondent time factors, sector 302 may be associated with users in Japan, China, and Pacific Asia and sector 306 may be associated with users in Europe.

To look closer at the correspondent event details, a table 304 may be generated that includes a column 305A that lists the unique identifiers for web session events 310, a column 305B may identify group tags associated with web session events 310, and a column 305C may provide descriptions for web session events 310. For example, unique identifier 569 may be associated with a web session event configured to account for a customer from Japan entering a website. Another event unique identifier 248 may be associated with web session event 310B. Web session event 310B may be configured to account for a message sent from a web application on a website server to users when a particular item is out of stock. The fact that this event regularly peaks in the same time when Asian customers are most active on site may be valuable business information. For example, web session event 310B may indicate Asian customers have much more probability to experience an out-of-stock event than other customers. This geographic segmentation may provide more insight into the web session events and may indicate more inventory for a particular item is needed when customers from Asia are on site.

A table 308 may be generated that identifies web session events 312A-312G within sector 306 of segmentation graph 300. For example, unique identifier 297 in table 308 may be associated with web session event 312A. Web session event 312A may be associated with a message sent during a web session directing users to call the company operating the website.

Web session event 312A is located within sector 306 of graph 300 and is therefore associated with European website users. Thus, segmentation graph 300 may indicate that users in Europe frequently need to call the company operating the website. Another web session event 312G within European sector 306 may be configured to account for another message sent from the web application to users indicating a particular warranty is only available in North or South America.

Segmentation graph 300 indicates that the warranty message associated with web session event 312G is most frequently sent to users in Europe. This may be a source of irritation to European users and may be resolved by the company providing warranties, or providing further explanation, to the Europe users.

Business insights of this type may be hard to find due to large amounts of data and the fact that customer activity indicators oscillate during the day in similar manners. Customer segmentation may provide a solution to this situation.

The multivariate approach to customer segmentation allows the data to be tracked as a whole, without artificially breaking the dataset into pieces.

As mentioned above, segmentation provided by the segmentation model does not necessarily have to be based on time and/or geography. For example, different Document Object Model (DOM) events can be used as factors for generating the segmentation model. In one example, the DOM events may comprise different form fields used by users for entering data into web pages of a website. The segmentation model may plot different web session events in relation to DOM form field factors. The segmentation model may generate a graph that shows relationships between the form fields and different portions or states of the web session or website. For example, the graph may indicate which form fields have high or low correlation with user on-line bookings or purchases.

Figure 10:
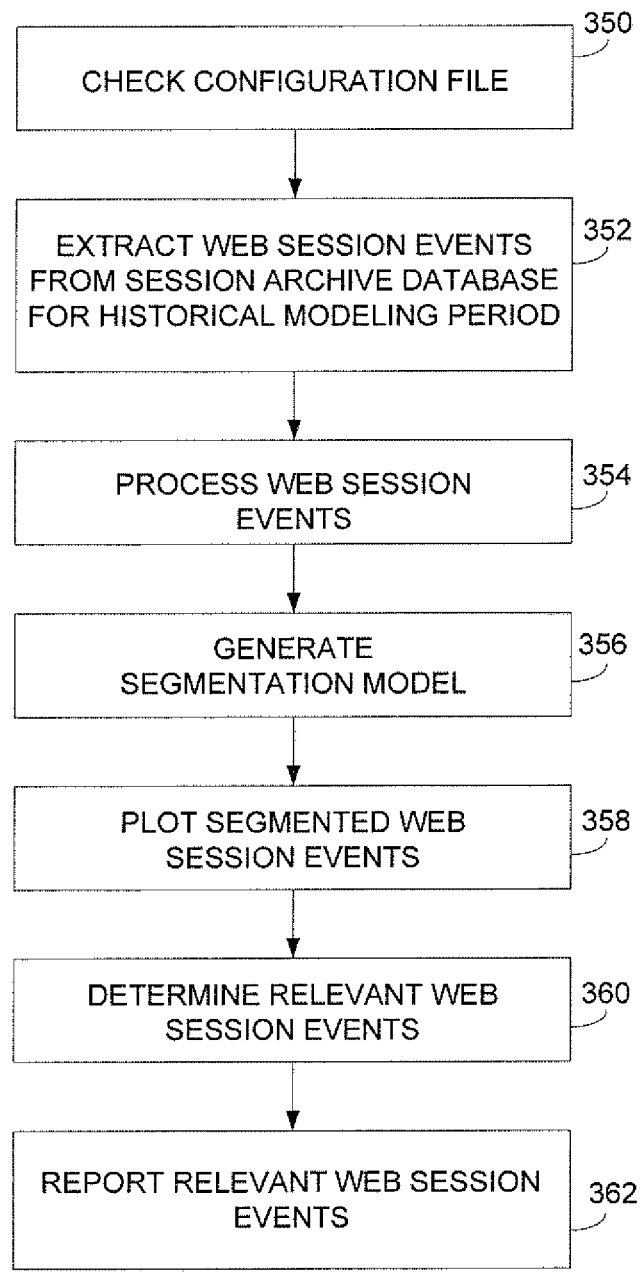
FIG. 10 depicts an example of a process for segmenting web session events.

FIG. 10 depicts an example process for generating the multivariate segmentation model and the segmentation graphs described above. In operation 350, a configuration file may be checked to identify what parameters to use for developing the segmentation model and plotting web session events on the segmentation graph. For example, the configuration file may identify the length of historical data to extract from the session archive 132 in FIG. 1. The historical data may comprise web session event counts for the last N months and may be configurable with a default of N=1. Parameters in the configuration file also may designate details on the connection to the session archive database, PLS-DA model parameters and so on.

In operation 352, the web session events may be extracted from the session archive database for the identified historical modeling period. For example, the web session events may have associated timestamps and the analysis system may extract the web session event counts from the session archive for the last month aggregated over one hour timestamps. In operation 354, the extracted web session events are processed. For example, not all web session events may occur every hour. Missing events are usually not present in the extracted data for a given timestamp. Operation 354 may impute the missed events data and perform other data cleaning procedures.

In operation 356, the segmentation model is generated from the processed web session events. For example, a PLS-DA model may be generated from the counts of occurrences of the web session events. The segmentation model may use any source of data, including flat files. In one example, a Microsoft SQL database may be used, and an Open Database Connector (ODBC) is used for connection to the database.

Creation of PLS-DA models is described in L. Eriksson, E. Johansson, N. Kettaneh-Wold, J. Trygg, C. Wikstroem, S. Wold "Multi- and Megavariate Data Analysis"2006, Umetrics; and Stable L. Wold (1987) Partial Least Squares Analysis with Cross-Validation for the Two-Class Problem: A Monte-Carlo Study, Journal of Chemometrics, 1, 185-196; which are herein both incorporated by reference.

PLS-DA model is a variant of more general partial least squares (PLS) model when the output variables are categorical rather than numerical. Generally, PLS is a method of relating two data matrices, X (input) and Y (output), to each other by linear multivariate model. It is useful for modeling of the systems with multivariate input and multivariate output with noisy, correlated and/or incomplete data in both X and Y. In one example the output variables in Y can comprise hourly time factors H0-H23 associated with different hours of a day. Although these factors have numerical values, these values cannot be used directly as numerical output. For example, the fact that 16>10 does not mean that time factor 4 pm is better or worse than time factor 10 am. In such case PLS-DA variant of PLS model may be used for segmentation modeling.

For properly normalized and centered data, the objectives of the PLS model are to
a) model X and Y and to
b) predict Y from X according to:

$$X=TP'+E$$

$$Y=UC'+F$$

$$Y=TC'+G \quad (1)$$

The scores matrices T and U contain the information related to observations (hourly timestamps in our example). The information related to the variables (web session event unique IDs and time factors) is stored in the X-loading matrix P and in Y-weight matrix C accordingly. The variation in the data that was left out of the modeling forms the residual matrices E, F and G. The first two equations in (1) solve the first objective, i.e. they provide the models for X and Y, the third equation indirectly expresses relationship between Y and X.

PLS algorithm consecutively calculates the next PLS component as a vector $t_j$ that maximizes the covariation between projections of X and Y onto this vector. On each step all three models in (1) are being updated simultaneously. This approach is similar to the principal components analysis (PCA) algorithm. The difference is that PCA is a maximum variance least squares projection of X whereas PLS is a maximum covariance model of the relationships between X and Y. On each step of the algorithm the weights $w_j$ are collected that show how the X-variables are combined to form the PLS-component $t_j$. The resulting matrix W is used to derive the direct PLS regression formula for the relationship between Y and X:

$$Y=XB+F, \quad (2)$$

where:

$$B=W(P'W)^{-1}C'=W*C' \quad (3)$$

The weights w*c are useful for the model analysis, because they represent the latent correlation structure between Y and X. The weights can also be plotted for both X-variables and Y-variables on the same loadings scatter bi-plot. These bi-plots are depicted in FIGS. 3, 6, 8 and 9.

For the PLS-DA model, the regression formula (2) may not make sense because outputs Y have no numerical values. However, the same algorithm may provide the weights matrix (3) that can be used to analyze the relationships between the data and the factors as was described above.

PLS-DA models are widely used in modern descriptive modeling. There exist several open source programs performing PLS-DA modeling. For example, one such program from R package "caret" can be downloaded from this link: http://rgm2.lab.nig.ac.jp/RGM2/func.php?rd_id=caret:plsda In operation 358, the segmentation model plots the web session events on the segmentation graph. These are the loadings scatter bi-plots described above. They may be obtained by projection of the w*c weights produced by the PLS-DA algorithm onto the plane defined by the first two PLS principal components. Since the PLS-DA algorithm consecutively calculates the most informative components, the first two principal components provide the most information about latent correlation between the web event variables and the time factors. Projection onto the first two components plane may be valuable for visual analysis. For example, the w*c weights for data points associated with the web session events may be plotted by the segmentation graph together with the w*c weights for time factors.

Relevant web session events may be identified in operation 360. For example, data points associated with web session error messages may be identified. In another example, web session events associated with sales of different products, or associated with Information Technology (IT) issues, may be identified. Identification of web events may consist of querying for the event details based on the event unique ID.

The relevant web session events may be reported to the associated personnel in operation 362. For example, segmentation reports for web session events associated with out of stock messages may be sent to warehouse and supply personnel, web session events associated with products sales may be sent to sales personnel, and web session events associated with network and website performance may be sent to IT department personnel.

Figure 11:
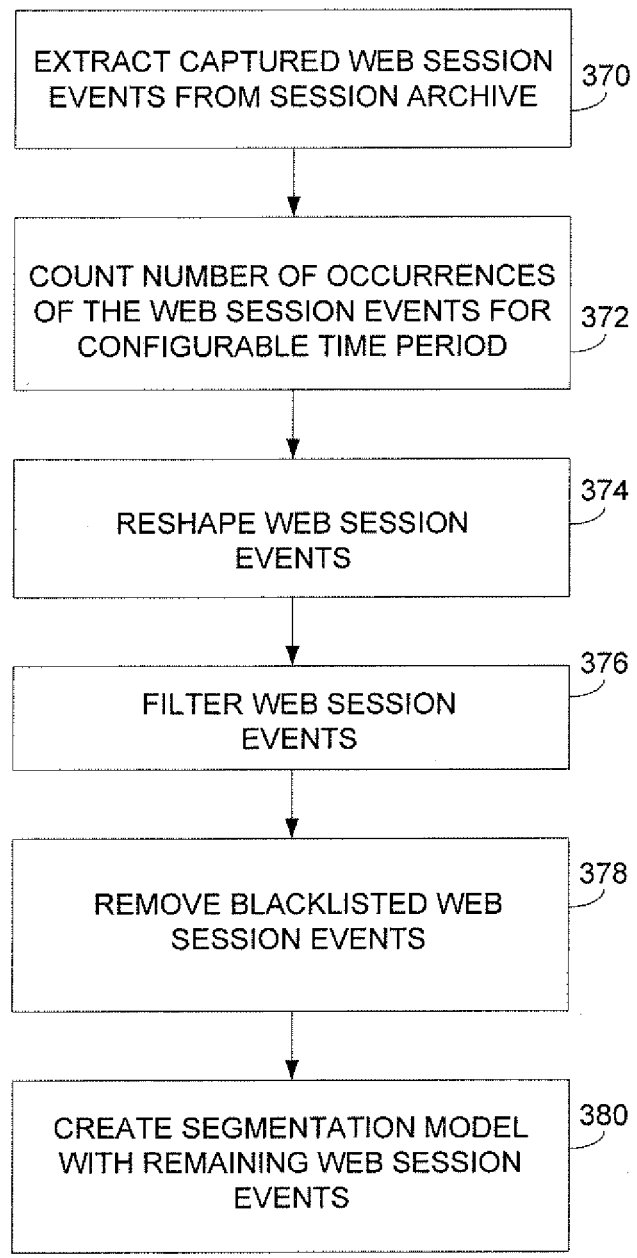
FIG. 11 depicts an example of a process for generating a segmentation model.

FIG. 11 depicts an example of operations for processing the captured web session events prior to generating the segmentation model. In operation 370, the web session events are extracted from the session archive database for the modeling time period. In operation 372, the number of occurrences for each web session event may be counted for sub-portions of the configurable historical time period. For example, the number of occurrences for each web session event may be aggregated for each hour over a last month of captured historical data. The aggregated web session events may be assigned associated timestamps and listed in a table. The number of occurrences for the web session events may be counted by the monitoring system prior to the aggregated web session events being processed by the analysis system.

In operation 374, the count values for the web session events may be reshaped into a "wide" table so that every row represents a certain timestamp observation and every column represents a certain event variable. Web session events may be coded in the columns of the wide table by a unique code (UNIQUEID-coded event variable).

In operation 376, the web session events may be filtered. For example, there may be no occurrences of certain web session events for certain one hour periods. A non-occurrence observation is alternatively referred to as a Not Applicable (NA). Web session events that only rarely happen might be filtered from the wide table in operation 376. For example, any web session events that have more than X % of NA values may be removed from the wide table. The X % value may be a selectable value specified in the configuration file 135 in FIG. 1 and in one example may have a default value of X=75%. The rationale for this is that a model is created of normal behavior, not exceptional behavior. Events that are rare but important can be tractably monitored by the operator on an individual (univariate) basis. All remaining NA values after these operations are replaced with zeroes, representing zero occurrences of corresponding events.

In operation 378, some web session events may be removed from web session model generation, monitoring and/or alerting. For example one of the web session events may be caused by an attempt to redeem cash bonus with not enough credits. This event might be fired at abnormal count levels as a result of an ad-hoc marketing campaign. In operation 380, the remaining processed web session events may be used for creating the segmentation model.

FIG. 12A depicts an example of a first table 390 identifying occurrences of web session events for a particular one hour time period as it looks after extraction from the database. In this example, column 392 identifies hour-long time periods. Column 394 lists the unique identifiers associated with each of the different web session events. Column 396 lists the number of occurrences for each of the different web session events for the hour-long time period identified in column 392.

FIG. 12B depicts an example of a second wide table 400 listing all the web session events for the entire historical modeling period after the data reshaping process 374 in FIG. 11. For example, row 402 may list the number of occurrences for each of the different web session events for a first one hour time period starting at 7:00 pm on Oct. 29, 2011. Column 404 lists all of the distinct one hour time periods during the historical modeling period that in one example may be one month. Column 406 lists the number of occurrences for each of the web session events for each of the one hour time periods listed in column 404.

For example, the web session event assigned unique identifier V.1 had 284,262 occurrences during the one hour time period starting at 2:00 am on Oct. 30, 2011. In another example, the web session event assigned unique identifier V.22 had zero occurrences during the one hour time periods starting at 11:00 pm on Oct. 29, 2011; 3:00 am on Oct. 30, 2011; and 5:00 am on Oct. 30, 2011. Web session event V.22 has few NA's during the period displayed on FIG. 4B, but still passed through the sparsity filter and is included in data modeling and monitoring process.

Figure 13:
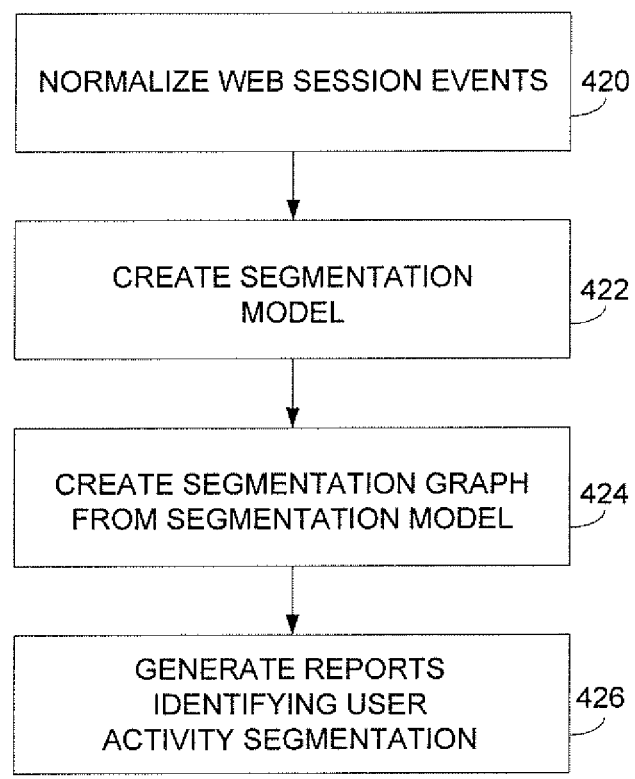
FIG. 13 depicts an example of a process for generating segmentation graphs and reports for web session events.

FIG. 13 depicts an example of a process for generating the segmentation model. In operation 420, the number of occurrences of the web session events may be normalized. As explained above, the web session model may represent normal web session behavior. For different web session events a normal range or occurrences may be different. For example, a normal average number of occurrences for a first web session event per hour may be 10,000 and a normal average number of occurrences for a second web session event per hour may be 5. Thus, the event counts may be normalized in operation 420 to be centered at mean and ranged to fall between 0 and 1.

In operation 422, the segmentation model is developed for the normalized occurrences of the web session events as described above. In operation 424, a segmentation graph is created from the segmentation model as shown above. As explained above, the segmentation graph depicts the scatter plot of the loading weights w*c for web session events on one hand and time factors on the other hand. These weights are calculated by PLS-DA model and they describe the maximum-covariance relationships between web session events and time factors in the PLS-DA principal component space. The scatter plot is a projection onto the plane defined by the first two principal components of the PLS-DA model.

In operation 426, user activity segmentation may be identified from the segmentation graphs. As described above, the points related to web session events may be plotted on the segmentation graph together with the points related to the time factors. Web session then can be segmented by taking into account their location relative to the direction specified by the time factor points as described above. This segmentation and the web events details for certain segments may be reported to the proper personnel.

The monitoring and modeling operations can be performed automatically as autonomous scripts. The monitoring periods also may be programmed to automatically generate segmentation graphs for programmable time periods, such as for 24 hours of captured web session events. Any other indicators of model deviation can be used to update the model. For example, the segmentation model may be automatically updated after unusual web session activities, such as after a marketing promotion or after a holiday.

Segmentation reports may be used for any type of customer experience segmentation. For example, user interface events associated with particular web browsers may be segmented and analyzed to determine if user operating errors are associated with particular web session environments.

Other operations may be initiated based on the segmentation reports. For example, a portion of the web session associated with a particular web session event may be replayed. At least some of the network data associated with the identified web session events may be synchronized with replaying at least some of the user interface events associated with the identified web session events in substantially a same order as previously occurring during the web sessions. Replay may provide additional information regarding why the web session events are associated with different segmentation factors. Capturing and replaying web session events are described in U.S. Pat. No. RE41903 and U.S. Pat. No. 8,127,000 which have both been herein incorporated by reference in their entirety.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. One or more of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a conventional rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Having described and illustrated the principles of various examples, it should be apparent that the examples may be modified in arrangement and detail without departing from such principles. We claim all modifications and variation coming within the spirit and scope of the following claims.

The invention claimed is:

1. A computer-implemented method, comprising:
identifying events for web sessions;
identifying a number of occurrences of the events for different times during a day;
generating a segmentation model from the number of occurrences of the events for the different times during the day;
using the segmentation model to produce a scatter plot having a first set of data points associated with a maximum number of occurrences for each of the events and a second set of data points associated with time factors identifying times of the day for the maximum number of occurrences for each of the events;
segmenting the events into different geographic regions based on relationships between the first set of data points associated with the maximum number of occurrences for each of the events and the second set of data points associated with the time factors; and
using the segmentation model to find clusters of the events that are correlated in the scatter plot, wherein the relationships between the first set of data points and the second set of data points are identified by comparing positions of the first set of data points with directions, as defined by the second set of data points, from an origin point of a cluster in the scatter plot.

2. The method of claim 1, wherein the segmentation model projects the first and second set of data points on the scatter plot in a circle around the origin point, and the first set of data points are associated with the second set of data points aligned in a same radial direction on the scatter plot.

3. The method of claim 2, wherein a distance of the first set of data points from the origin point indicates an amplitude of oscillation for the number of occurrences of the events for the web sessions.

4. The method of claim 1, wherein segmenting the events comprises identifying groups of the data points associated with same times of the day.

5. The method of claim 1, wherein segmenting the events into different geographic regions comprises identifying groups of the events with the largest number of occurrences during a particular time period during the day and associating the groups of the events with the different geographic regions.

6. The method of claim 1, wherein segmenting the events into different geographic regions comprises associating the different geographic regions with different sectors of the scatter plot based on the directions.

7. The method of claim 1, wherein the segmentation model identifies oscillation parameters for a periodicity of the occurrences of the events.

8. The method of claim 1, wherein the events comprise interactions between a web application and users during the web sessions.

9. The method of claim 1, wherein the segmentation model comprises a partial least squares discriminant analysis (PLS-DA) model.

10. An apparatus, comprising:
a memory configured to archive web session events for web sessions; and
logic circuitry configured to:
extract the web session events from the memory;
generate a segmentation model comprising segmentation factors for the web session events based on a number of occurrences of the web session events for different time periods, wherein the segmentation factors associate different geographic locations to the different time periods based on an expected peak in the number of occurrences of the web session events for the different time periods;
identify the different geographic locations for the web session events based on relationships between a first set of data points associated with the number of occurrences for the web session events and a second set of data points associated with the segmentation factors; and
using the segmentation model to find clusters of the web session events that are correlated in a scatter plot produced by the segmentation model, wherein the relationships between the first set of data points and the second set of data points are identified by comparing positions of the first set of data points with directions, as defined by the second set of data points, from an origin point of a cluster in the scatter plot.

11. The apparatus of claim 10, wherein the segmentation factors are associated with the different time periods.

12. The apparatus of claim 10, wherein the segmentation factors comprise document object model (DOM) events.

13. The apparatus of claim 10, wherein the logic circuitry is further configured to use a partial least squares discriminant analysis (PLS-DA) model to identify the different geographic locations for the web session events relative to the segmentation factors.

14. The apparatus of claim 10, wherein each of the segmentation factors correspond to one of the different geographic locations.

15. A computer-implemented method, comprising:
identifying web session events comprising interactions between a web server and computing devices during web sessions;
aggregating occurrences of the web session events for timestamp periods;
generating a segmentation model based on the occurrences of the web session events for the timestamp periods;
using the segmentation model to describe the web session events as a first set of data points in a partial least squares (PLS) components space associated with the occurrences of the web session events for the timestamp periods;
using the segmentation model to describe segmentation factors as a second set of data points in the PLS components space, wherein the segmentation factors associate different geographic locations to the timestamp periods based on an expected peak in the occurrences of the web session events for the timestamp periods;
identifying the different geographic locations for the web session events based on relationships between the first set of data points and the second set of data points; and
using the segmentation model to find clusters of the web session events that are correlated in the PLS components space, wherein the relationships between the first set of data points and the second set of data points are identified by comparing positions of the first set of data points with directions, as defined by the second set of data points, from an origin point of a cluster in the PLS components space.

16. The method of claim 15, wherein the segmentation model is used to find the web session events that are correlated in the PLS components space by detecting data points associated with the clusters of web events located in same sectors of the PLS components space.

* * * * *